United States Patent

[11] 3,591,110

| [72] | Inventors | Kenneth C. Dramer<br>Thousand Oaks, Calif.;<br>Harold N. Tobie, Mercer Island, Wash. |
|---|---|---|
| [21] | Appl. No. | 817,780 |
| [22] | Filed | Apr. 21, 1969 |
| [45] | Patented | July 6, 1971 |
| [73] | Assignee | Lear Siegler, Inc. |

[54] AUTOMATIC THROTTLE CONTROL SYSTEM FOR AN AIRCRAFT
10 Claims, 1 Drawing Fig.

[52] U.S. Cl. .................................................. 244/77 D
[51] Int. Cl. ...................................................... B64c 13/18
[50] Field of Search .......................................... 244/77, 77 A, 77 D, 77 DZ

[56] References Cited
UNITED STATES PATENTS
3,437,292  4/1969  Greene ........................ 244/77 (A)

*Primary Examiner*—Milton Buchler
*Assistant Examiner*—Jeffrey L. Forman
*Attorney*—Christie, Parker & Hale ABSTRACT: During a landing maneuver, a conventional automatic throttle control system for an aircraft actuates its throttle in response to a first signal representative of the desired descent value of an aircraft parameter that influences proper throttle position during landing and to a second signal representative of the actual value of the parameter. As the aircraft approaches touchdown, the first signal is modified to represent a near stall value of the parameter lower than the desired touchdown value, so the throttle normally retards to its minimum position. If conditions cause a drop in the actual value of the parameter below the near stall value, the control system advances the throttle to correct the discrepancy. The corrective action is augmented by a third signal, representing the rate of change of the second signal, when the third signal exceeds a threshold value.

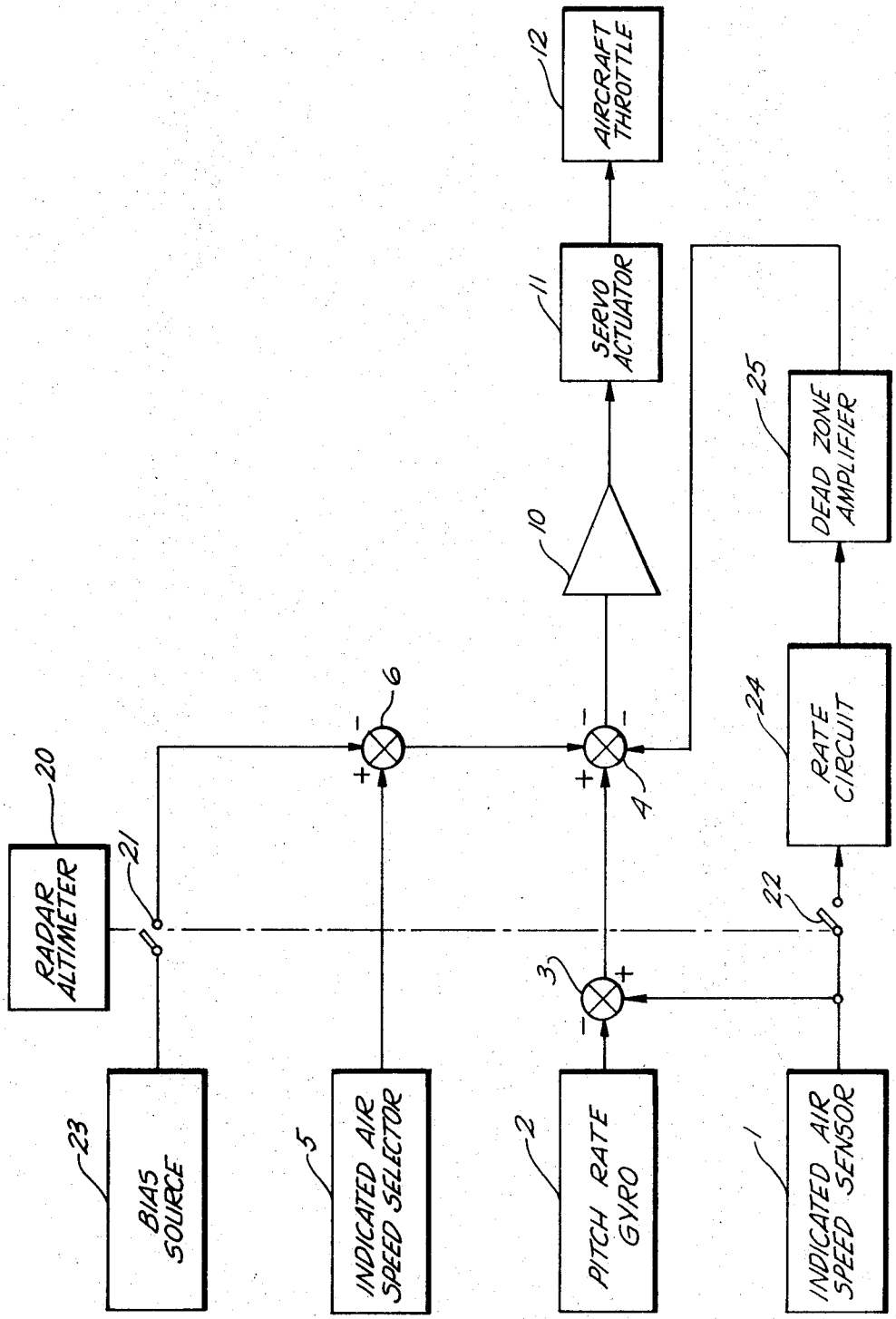

AUTOMATIC THROTTLE CONTROL SYSTEM FOR AN AIRCRAFT

BACKGROUND OF THE INVENTION

This invention relates to automatic flight control and, more particularly, to an automatic throttle control system for an aircraft operative during a landing maneuver.

It is common practice to control an aircraft throttle automatically during a landing maneuver. The desideratum is to have the aircraft moving as slowly as possible at touchdown without causing stall or loss of stability immediately prior thereto. In general, an aircraft parameter that influences proper throttle position of the aircraft during landing to achieve the desideratum is utilized to command the throttle. Indicated airspeed, lift, and angle-of-attack are such parameters. Assuming for example that the aircraft parameter is indicated airspeed, an indicated airspeed selector produces a signal representative of the desired descent value of the indicated airspeed and an indicated airspeed sensor produces a signal representative of the actual value of the indicated airspeed. The aircraft throttle is actuated responsive to the difference between these signals, thereby correcting the discrepancy between the desired and actual values of the indicated air speed. When the aircraft approaches touchdown, usually at the point of initiation of flare, the automatic throttle control system is rendered inoperative and the throttle is retarded to its minimum position so the aircraft is not moving too fast at touchdown.

Although most automatic landings are executed without any difficulty, occasionally the aircraft stalls or experiences an excessively hard landing. In contemporary commercial aviation, even an occasional hard landing is objectionable because of the discomfort and inconvenience it causes to the passengers. It was previously thought that the occasional hard automatic landing maneuvers that do occur are caused by defective operation of the automatic throttle control system.

SUMMARY OF THE INVENTION

The invention is bottomed upon the discovery that hard landing maneuvers are more properly attributable to wind shear and/or gusts encountered after the throttle has been retarded to its minimum position than to defective operation of the automatic throttle control system. Accordingly, the invention contemplates the modification of the electrical signal representing the difference between the desired and actual values of the aircraft parameter utilized for automatic throttle control as the aircraft approaches touchdown. In effect, the selected desired descent value of the aircraft parameter is suddenly lowered to a near stall value slightly below the desired touchdown value of the parameter. The automatic throttle control system therefore normally retards the throttle to its minimum position in an attempt to correct the actual value of the parameter to agree with the lowered desired value. If an abnormal wind gust and/or disturbance occurs that reduces the actual value of the aircraft parameter below the near stall value after the throttle is retarded to its minimum position, the control system advances the throttle once again to move the actual value of the parameter above the desired touchdown value. In summary, the throttle is retarded to its minimum position under normal conditions as the aircraft approaches touchdown, although the control system still remains operative to correct for abnormal wind conditions.

The control of the throttle under abnormal wind conditions can be augmented by further modifying the difference signal responsive to the rate of change of the actual value of the parameter above a threshold value.

BRIEF DESCRIPTION OF THE DRAWING

The features of a specific embodiment of the best mode contemplated of carrying out the invention are illustrated in the drawing, the single FIGURE of which is a block schematic diagram of an automatic throttle control system incorporating the principles of the invention.

DETAILED DESCRIPTION OF THE SPECIFIC EMBODIMENT

In the drawing are the components of an automatic throttle control system located on board an aircraft. The outputs of an indicated airspeed sensor 1 and a pitch rate gyro 2 are coupled to a summing junction 3. As depicted by the mathematical signs in the drawing, the signals produced by sensor 1 and gyro 2 are differentially combined at summing junction 3. Sensor 1, which produces a signal representative of the actual value of the indicated airspeed of the aircraft, could be an instrument employing a Pitot tube. Gyro 2, which produces a signal representative of the rate of change of pitch of the aircraft, could be a conventional, commercially available gyroscopic instrument. The output of summing junction 3 is connected to one input of a summing junction 4 and the output of an indicated airspeed selector 5 is coupled through a summing junction 6 to the other input of summing junction 4. The signals from summing junction 3 and selector 5 are differentially combined at summing junction 4, as depicted by the mathematical signs in the drawing. Selector 5, which produces a signal representative of the desired descent value of indicated airspeed for the aircraft, could be a fixed signal source or a variable signal source that is adjustable by the pilot. The output of summing junction 4 is coupled through an amplifier 10 to a servo actuator 11, which drives an aircraft throttle 12.

During the descent of the aircraft prior to flare, the described components produce at the output of summing junction 4 a command signal that positions throttle 12 so as to maintain the actual indicated airspeed read by sensor 1 at the desired indicated airspeed determined by selector 5. As the aircraft approaches touchdown, at a predetermined altitude, preferably at the point of initiation of flare, a radar altimeter 20 actuates normally open switches 21 and 22. Switch 21 couples a fixed bias source 23 to summing junction 6 where the bias signal from source 23 is combined differentially with the signal from selector 5, as depicted by the mathematical signs in the drawing. Switch 22 couples sensor 1 to a rate circuit 24. A dead zone amplifier 25 couples the output of rate circuit 24 to summing junction 4. At summing junction 4, the signal from amplifier 25 is combined differentially with the signal from summing junction 3, as depicted by the mathematical signs in the drawing. The fixed bias signal from source 23 reduces the signal generated by summing junction 6 to represent a near stall value slightly lower than the desired indicated airspeed at touchdown of the aircraft.

Therefore, in the course of a normal landing a large differential suddenly appears between the actual and the desired indicated airspeed values. As the control system attempts to correct the discrepancy, a command signal appears at the output of summing junction 4 that retards throttle 12 to its minimum position. If the actual value of the indicated airspeed drops below the near stall value during flare, the command signal changes polarity and advances throttle 12 once again away from its minimum position, thereby increasing the actual indicated airspeed to a safe value. The signal from rate circuit 24 augments this corrective action. Amplifier 25 has a threshold level above the normal changes in airspeed that would occur during flare. When a drastic reduction in the actual indicated airspeed takes place, the signal from rate circuit 24 exceeds the threshold level of amplifier 25 and, therefore, is combined at summing junction 4 with the other signals.

To further illustrate the operation of the invention, a hypothetical case is considered. Assuming that the desired descent value of the indicated airspeed given by selector 5 is 150 knots and the desired touchdown value of indicated airspeed is 145 knots, the amplitude of bias signal from source 23 is selected to represent a value of 10 knots. Because of the corrective action of the automatic throttle control system prior to flare, the actual indicated airspeed given by sensor 1 is essentially 150 knots at the moment switches 21 and 22 are closed. After switches 21 and 22 are closed, the signal generated by summing junction 6 represents 140 knots. Therefore, the control system retards throttle 12 to its minimum position in an attempt to correct the discrepancy between the actual and desired indicated airspeed. Assuming a drastic disturbance occurs that suddenly reduces the actual indicated airspeed to 130 knots, the control system then advances throttle 12 away from its minimum position in order to correct the discrepancy between the actual and desired values of indicated airspeed.

In summary, the effect of bias source 23 is to retard throttle 12 during flare to its minimum position under normal conditions, without rendering the control system inoperative. Accordingly, the control system can correct for a drop in the actual indicated airspeed below the near stall value.

In the drawing, three separate summing junctions are shown for the purposes of illustrating the functions of the various signals that are combined to form the command signal. In fact, all three summing junctions could be replaced by a single summing junction where all the signals are combined or by several summing junctions where different combinations of signals are combined than shown.

Although the invention is described in connection with an automatic throttle control system based on indicated airspeed, a system that controls any other parameter that is known to influence proper throttle position could also be utilized. Examples of such parameters are lift and angle-of-attack. Furthermore, the controlled parameter could also be a combination of indicated airspeed, angle-of-attack, and/or lift. It should be noted that in a control system based on angle-of-attack, the actual value of the parameter normally is numerically smaller than the desired descent value and the desired descent value is numerically smaller than the desired touchdown value. The term "a value of the parameter lower than the desired value at touchdown" includes this situation as well. The terms "lower" and "drop" are used in this specification in a relative sense to indicate a movement of the value of the parameter toward an aircraft stall condition.

It should be noted that the bias signal can be introduced as a ramp function (or other) so as to program the desired manner of retarding the throttle.

What we claim is:

1. An automatic throttle control system for an aircraft operative during a landing maneuver, the system comprising:
   means for producing a first signal representative of the desired descent value of an aircraft parameter that influences proper throttle position of the aircraft during landing, the desired descent value being higher than the desired value at touchdown;
   means for producing a second signal representative of the actual value of the aircraft parameter during landing;
   means responsive to the first and second signals for producing a third signal representative of the difference between the desired descent value and actual value;
   means responsive to the third signal for actuating the throttle of the aircraft; and
   means as the aircraft approaches touchdown for modifying the third signal to represent the difference between the actual value and a near stall value lower than the desired value at touchdown, the modified third signal having a polarity to retard the throttle to its minimum position while the actual value remains higher than the near stall value and to actuate the throttle responsive to changes in the modified third signal while the actual value remains lower than the near stall value.

2. The control system of claim 1, in which the modifying means comprises a constant bias signal that is combined with one of the other signals.

3. The control system of claim 2, in which the modifying means additionally comprises means for producing a fourth signal representative of the rate of change of the actual value of the parameter and means for combining the fourth signal with one of the other signals in a sense to augment the corrective action of the control system when the fourth signal exceeds a predetermined threshold value.

4. The control system of claim 3, in which means are provided for producing a fifth signal representative of the rate of change of pitch of the aircraft and means are provided for combining the fifth signal with one of the other signals.

5. The control system of claim 4, in which the aircraft parameter is indicated airspeed.

6. The control system of claim 1, additionally comprising: means for sensing the altitude of the aircraft; and means responsive to the altitude sensing means for actuating the modifying means when the aircraft descends to a predetermined altitude.

7. An automatic throttle control system for an aircraft operative during a landing maneuver, the system comprising:
   means for producing a first signal representative of the desired descent value of an aircraft parameter that influences proper throttle position of the aircraft during landing;
   means for producing a second signal representative of the actual value of the aircraft parameter during landing;
   means prior to flare responsive to the difference between the first and second signals for actuating the throttle of the aircraft;
   means for generating a fixed bias signal; and
   means during flare responsive to the difference between the first and second signals and to the bias signal for actuating the throttle of the aircraft such that the throttle is normally retarded to its minimum position.

8. The control system of claim 7, in which the value of the bias signal is such that the throttle is advanced away from its minimum position whenever the actual value of the aircraft parameter represented by the second signal drops below the touchdown value.

9. The control system of claim 7, in which the value of the bias signal is such that the throttle is advanced away from its minimum position whenever the actual value of the aircraft parameter represented by the second signal moves past a desired touchdown value in a stall direction.

10. The control system of claim 7, additionally comprising a radar altimeter, the means during flare for actuating the throttle being rendered operative responsive to the radar altimeter at a predetermined aircraft altitude.

PO-1050
(5/69)

6309

UNITED STATES PATENT OFFICE
CERTIFICATE OF CORRECTION

Patent No. __3,591,110__   Dated __July 6, 1971__

Inventor(s)  Kenneth C. Kramer and Harold N. Tobie

It is certified that error appears in the above-identified patent and that said Letters Patent are hereby corrected as shown below:

Page 1, column 1, [72] Inventors "Kenneth C. Dramer" should be --Kenneth C. Kramer--.

Signed and sealed this 6th day of June 1972.

(SEAL)
Attest:

EDWARD M. FLETCHER, JR.             ROBERT GOTTSCHALK
Attesting Officer                   Commissioner of Patents